Sept. 28, 1965 L. G. METZGER 3,208,567
REVERSIBLE MAGNETIC PARTICLE CLUTCH
AND BRAKE WITH COOLING MEANS
Filed April 20, 1964 3 Sheets-Sheet 2

United States Patent Office 3,208,567
Patented Sept. 28, 1965

3,208,567
REVERSIBLE MAGNETIC PARTICLE CLUTCH AND BRAKE WITH COOLING MEANS
Louis G. Metzger, New York, N.Y., assignor to Potter Instrument Company, Inc., Plainview, N.Y., a corporation of New York
Filed Apr. 20, 1964, Ser. No. 361,077
6 Claims. (Cl. 192—12)

This invention relates generally to magnetic clutches and, more particularly, relates to an improved electromagnetic iron particle clutch having selectively operable brake and reversible clutch operation allowing high speed, programmed cycling with a minimum of intermediary transitory phenomena.

Reversible magnetically energized clutches for low and medium speed operations having a selectively energizable brake are known to the art. In the past, requirements for high speed selectively operable brake and reversible clutch operations have been met by axially coupling two electromagnetic iron particle clutches and a similar brake, both clutches being operated in opposite rotating directions. It is evident that such an arrangement makes it difficult to mechanically couple all mating shaft elements together, since flexible couplings will not permit high speed cycling operations without introducing transitory oscillating phenomenas, the disappearance of which will cause considerable lag time. On the other hand, rigid couplings will necessitate precise shaft alignments, which for practical applications, can be obtained with great difficulties only. It is, furthermore, quite evident that the coupling of such independent elements will require long shaft lines between the electromagnetically active parts and therefore establish polar shaft spring constants making rapid operations impossible without extended time consuming transitory oscillations.

Further, such clutch assemblies have been difficult to efficiently cool and, thus, are limited in their ability to cycle at high frequencies, above limiting power levels.

These, coupled with criticalities in assembly procedures have, of course, made such clutch assemblies relatively expensive precluding utilization in many desired environments.

It is, therefore, an object of the present invention to provide an improved dry and/or iron particle clutch to selectively couple an output shaft to one of two oppositely rotated input shafts or to a brake assembly in which the magnetic circuit paths use common elements to provide a single housed compact unit design, with a minimum length, spacing all active parts closely together, therefore optimizing all characteristics for high speed cycling operations. Another desirable feature of this unitized arrangement is the utilization of a radial instead of an axial transfer gap, as commonly used in current designs. Such a radial transfer gap will make possible a much closer control over a minimum air gap. This will allow a greater flow of magnetic flux into the working air gap and, thus, reduce the electromagnetic time constant to a minimum. May it be stated that it is much more difficult to closely control very small axial transfer gaps.

It is a further object of the present invention to provide a reversible clutch assembly with an energizable brake in which a ducted axial air flow is provided to enable cycling at high frequencies and maximum power levels with reasonable operating temperatures.

In accordance with these objects, there is provided, in a preferred embodiment of this invention, a reversible clutch assembly with a selectively operated brake which comprises a single rotatably mounted output shaft having three spaced-apart, radially extending discs mounted fixedly thereon. A brake assembly consisting of a first and second stationary member is provided about the middle disc. The space between the brake stationary members and the middle disc is filled with magnetic particles. A coil is provided to selectively establish a magnetic flux between the stationary members and the disc thereby to cause the particles to lock in chains preventing relative rotation between the disc and the stationary magnetic members. Each magnetic member is provided with an annular portion extending axially therefrom.

About each of the end discs, there is provided an enclosing clutch rotor structure. The structure encloses the disc and the space therebetween is filled with magnetic particles. This structure extends axially within the axial extension of the brake magnetic members thereby to provide a small uniform radial gap for transfer of magnetic flux thereacross. Each clutch assembly is provided with a selectively energized winding to generate an electromagnetic flux which will pass through the common wall of the brake magnetic members and extend across the interfacial gap between the respective disc and the enclosing clutch structure. Each enclosing clutch structure projects outwardly as a hollow shaft sleeve, concentrically with the inner output shaft and driven constantly but in opposite directions thereby to provide selectively energized coupling of the output shaft for opposite rotation thereof. The use of common magnetic circuit members permits use of a short shaft for the assembly.

An axial path is provided for flow of cooling air or gas through the entire assembly to cool the assembly.

Each of the clutch rotors are preferably provided with radially extending slots thereby to increase the eddy current path ohmic resistance to suppress eddy currents. These slots may be closed up with a plastic filler.

Radial knurling may be provided on the disc faces and also on the opposing inner faces of the rotor and stator. This will improve and accentuate the coupling effect by providing discontinuous surfaces.

Having briefly described this invention, it will be described in greater detail along with other objects and advantages in the following portions of the specification, which may best be understood by reference to the accompanying figures, of which:

Figure 1:
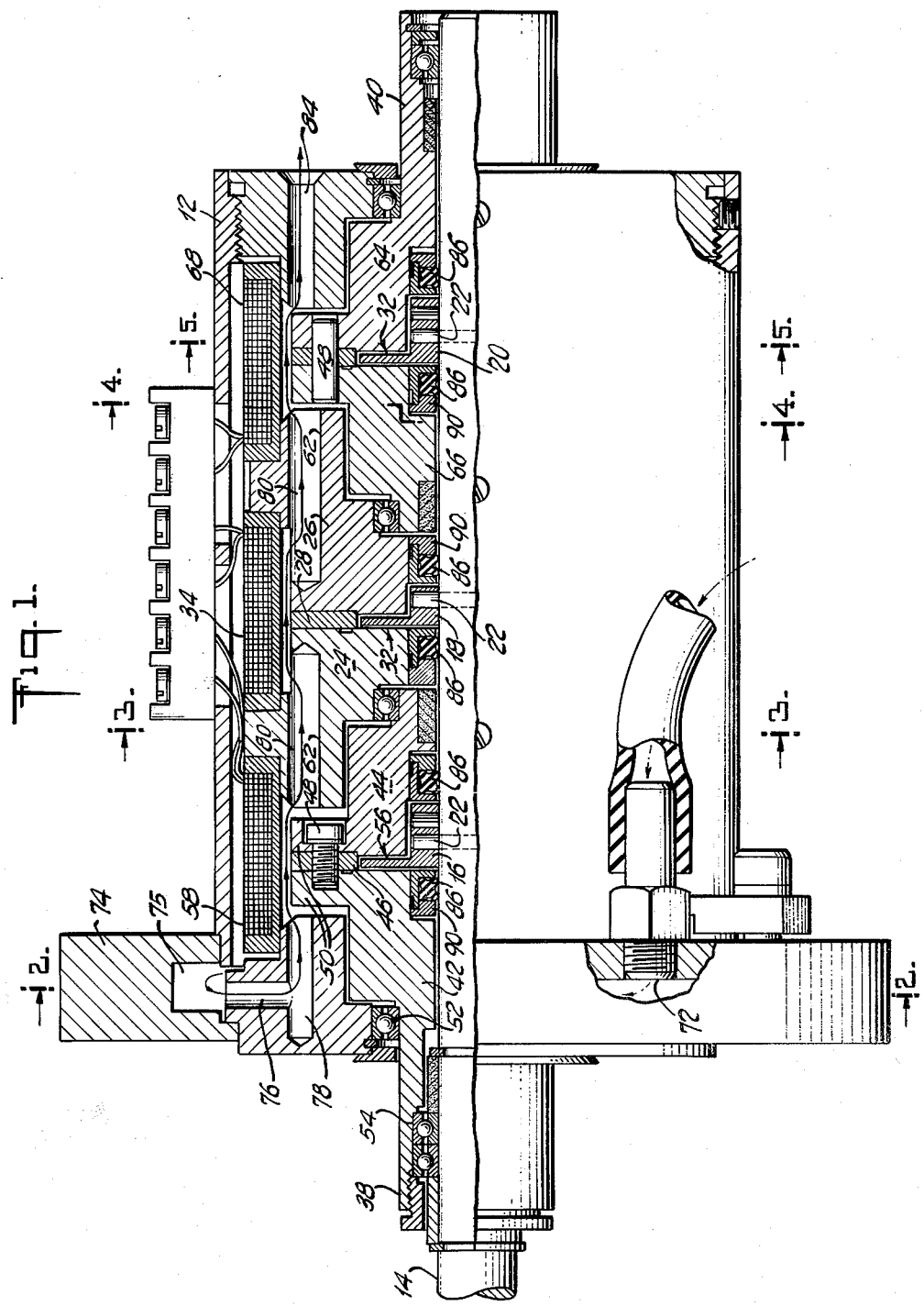
FIG. 1 is a sectioned view of a clutch constructed in accordance with the present invention.
Figure 2:
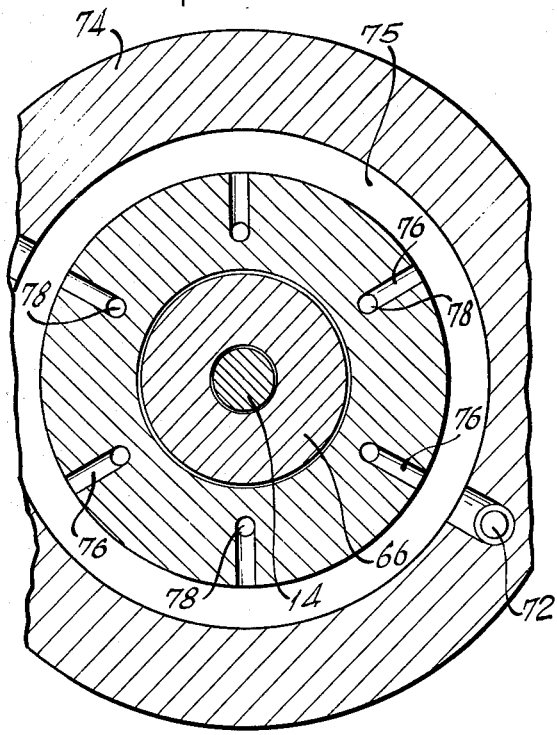
FIG. 2 is a sectioned view taken along lines 2—2 of FIG. 1.
Figure 3:
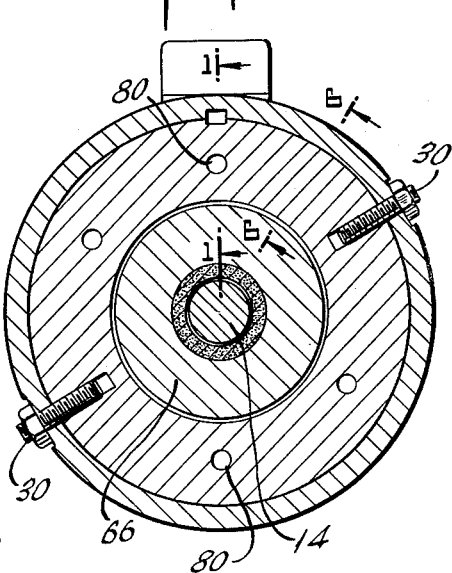
FIG. 3 is a sectioned view taken along lines 3—3 of FIG. 1.
Figure 4:
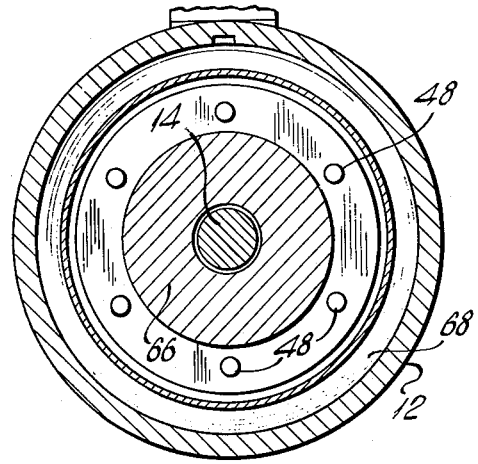
FIG. 4 is a sectioned view taken along lines 4—4 of FIG. 1.
Figure 5:
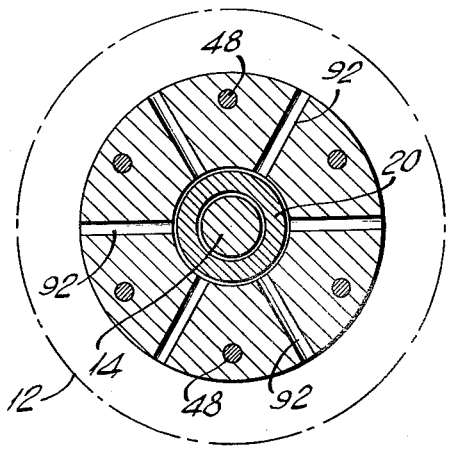
FIG. 5 is a sectioned view taken along lines 5—5 of FIG. 1.
Figure 6:
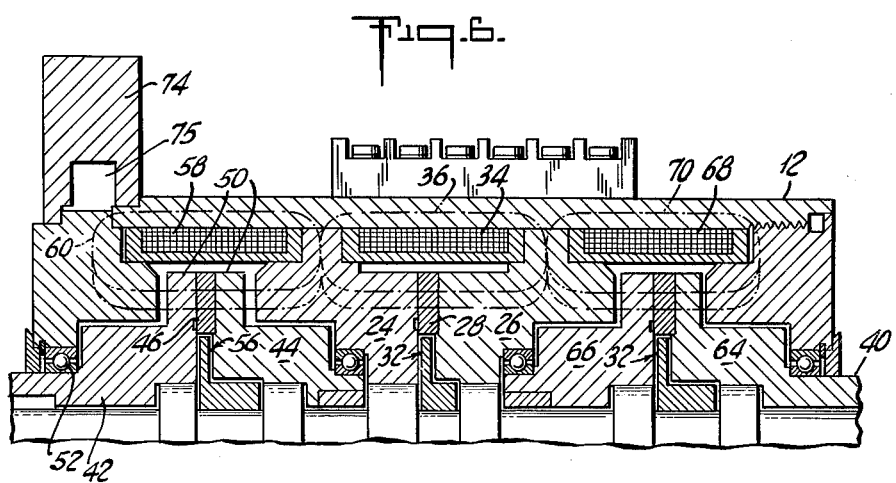
FIG. 6 is a sectioned view of the clutch illustrating the flux path.

In the figures, there is shown a reversible magnetic particle clutch and brake assembly which is housed within a generally cylindrical housing 12. The assembly is provided with a common output shaft 14 on which is mounted a first, second and third radially extending clutch plate or disc 16, 18 and 20 respectively. The discs may be affixed to the shaft by doweling of the hubs thereto by dowels 22.

The central disc 18 is the braking disc and it is enclosed within a brake armature consisting of mating identical stationary magnetic members 24, 26 which are spaced apart by an annular spacer 28 of nonmagnetic, nonconducting material such as a glass epoxy ring. The spacer provides a positive control of the interfacial gap between the disc and armature members. It also prevents formation of eddy currents within its own body. The magnetic members 24, 26 may be secured in position by dowels 30 extending through the housing into the respective members.

In order to couple the brake disc 18 to the brake armature, the space therebetween is filled with magentic particles 32 and driver coil 34 is provided to generate magnetic flux, the path of which is indicated by line 36 across the interfacial gap between the disc and the surrounding armature thereby to lock the particles into chains which secure the disc to the armature structure, thus providing the desired braking action.

Clutch armature structures 42, 44 and 64, 66 are rotatably mounted about each of the clutch discs 16 and 20 to provide means for selectively coupling the output shaft 14 to one of the continuously rotated input shafts 38 and 40 which are rotated in opposite directions. The armature structure part of shaft sleeve 38 comprises a first magnetic member 42 and a second magnetic member 44 spaced apart at a predetermined distance by an annular spacer 46 such as a glass epoxy spacer and secured together in torque transmitting relationship by a plurality of bolts 48 spaced about the periphery of the upstanding flange 50 on each member. The armature structure is rotatably mounted by bearings 52. Relative rotation between shaft 38 and shaft sleeve 14 is provided by bearings 54. The space between the armature and disc is filled with dry magnetic particles 56. Driver coil 58 is provided to generate the magnetic flux which traverses the armature structure and the disc as indicated by the flux path 60. The powder will lock into chains joining the armature structure to the disc thereby to provide for conjoint rotation thereof.

In order to provide a flux path of high permability, the brake armature members are provided with axially extending portions 62 which overlap the axially extending body of the clutch armature sections. The cylindrical gap therebetween is held to close tolerances so as not to introduce excessive air gaps in the magnetic circuit. By this construction, the units can be assembled without criticality of adjustment of the axial positions of the armatures. Thus, despite slight endplay in the armature, inevitable with ball bearings, or axial positioning inaccuracies of components due to a multitude of related axial tolerances on various parts which might affect a closely held axial transfer air gap, the actual radial transfer air gap in the magnetic circuit will be maintained at essentially the predetermined reluctance.

The clutch extended into shaft sleeve 40 is identical in structure consisting of magnetic members 64, 66 with an associated coil 68 which generates flux indicated by line 70. The details of assembly components and mounting bearings are identical to the structure of shaft sleeve 38 and are not repeated here.

Thus, there is provided a clutch which will couple the output shaft 14 selectively to shaft sleeve 38, shaft sleeve 40 or to brake assembly upon actuation of the windings 58, 68, or 34 respectively.

For high frequency cycling and for high power cycling, the temperature buildup is precluded by flowing air in a general axial direction throughout the clutch assembly. Air is introduced into the orifices 72 in cover plate 74. The cover plate is provided with an annular header passage 75 communicating with a plurality of radially extending passages 76, each of which enters axially extending passage 78. The air flow will pass through the radial space between the winding 58 and its associated armature and will be transmitted through member 62 by ducts 80 spaced therein. The air will pass under winding 34 through the ducts 82 under winding 68 and will be exhausted through ducts 84.

The cooling medium may, for example, be compressed air which may be passed through a heat exchanger before entering the clutch to improve the heat removing capability of the air flow. With air flow, cycling at high frequencies and/or high power rates can be tolerated with reasonable operating temperatures.

To seal the magnetic particles within the desired locations, a plurality of shaft seals 86 are provided. To further protect the bearings from entry of any powder which might escape past the seals, permanent magnets 90 acting as traps are provided at each bearing location.

To suppress eddy currents and, thus, to reduce the heat generated within the clutch, it is advisable to provide radially extending slots 92 cut into portions of the armatures traversed by the pulsating flux. These slots, which are preferably evenly spaced about the periphery of the armature, will lengthen the eddy curent path and, thus, increase the ohmic resistance of the path since the path is restricted to the surface of the armature by skin effect at higher frequencies. The slotted front face of the rotor is preferably covered by a thin steel cover disc cemented thereto by an adhesive insulating film. Teflon shims may be used to define the separation of the cover disc from the armature. The Teflon shims and the adhesive film will prevent the cover disc from short-circuiting the slotted sections. The cover disc is preferably provided in order to maintain a uniform transfer gap between the rotor sections and the cover discs so as to eliminate the need for additional magneto motor force in the driver coils.

This invention may be variously modified and embodied within the scope of the subjoined claims.

What is claimed is:

1. A reversible magnetic particle clutch and brake comprising an output shaft having a first, second and third radially extending disc spaced apart therealong and affixed thereto, a brake armature fixedly positioned about said second disc, the space between said disc and said armature being filled with magnetic particles, a brake driver coil to establish magnetic flux extending through said armature and disc when energized, said brake armature having axially extending sections, a first clutch armature coupled to a first input shaft, said first armature being rotatably mounted and enclosing said first disc, magnetic particles positioned between said first disc and said first armature, and a first clutch driver coil to establish a magnetic field extending through one axial extension of said brake armature, said first clutch armature and said first disc when energized, a second clutch armature coupled to a second input shaft, said second armature being rotatably mounted about said third disc, magnetic particles in the space between said third disc and said second clutch armature, and a second clutch driver coil to establish a magnetic flux extending through the other axial extension of said brake armature, said second clutch armature and said third disc when energized.

2. A reversible magnetic particle clutch and brake in accordance with claim 1 in which the radial clearance between the respective clutch armatures and the axially extending sections of the brake armature are maintained at the desired close tolerance to provide a substantially fixed circuit reluctance despite axial movement of said clutch armatures.

3. A reversible magnetic particle clutch and brake in accordance with claim 1 which includes radial ducts extending into the space between said first clutch armature and said first clutch driver coil, axially extending ducts coupling said last named space to the space between said brake armature and said brake driver coil and axially extending ducts extending from said last named space to the exterior of said clutch to provide a continuous generally axially-extending air passage for the continuous passage of cooling air through the entire clutch.

4. A reversible magnetic particle clutch and brake in accordance with claim 1 which includes seals including permanent magnets, on said output shaft astraddle each of said discs.

5. A reversible magnetic particle clutch and brake in accordance with claim 1 in which said armatures are provided with radially extending slots to increase the skin current path of currents induced therein by high frequency flux changes.

6. A reversible magnetic particle clutch and brake in accordance with claim 5 in which said armatures are provided with annular face plate adhered to and insulated from each of the armatures to cover said radially extending slots.

References Cited by the Examiner

UNITED STATES PATENTS

| | | | |
|---|---|---|---|
| 2,629,552 | 2/53 | Dickey | 192—21.5 |
| 2,695,675 | 11/54 | Frye | 192—21.5 |
| 2,791,308 | 5/57 | Barrett et al. | 192—21.5 |
| 2,924,315 | 2/60 | Brill et al. | 192—21.5 |

DAVID J. WILLIAMOWSKY, *Primary Examiner.*